(12) United States Patent
Allidieres

(10) Patent No.: US 8,453,688 B2
(45) Date of Patent: Jun. 4, 2013

(54) KIT AND DEVICE FOR CONNECTING AND TRANSFERRING FLUID AND THE USE OF SAID DEVICE

(75) Inventor: Laurent Allidieres, Grenoble (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1013 days.

(21) Appl. No.: 11/814,762

(22) PCT Filed: Jan. 6, 2006

(86) PCT No.: PCT/FR2006/050004
§ 371 (c)(1),
(2), (4) Date: Nov. 13, 2009

(87) PCT Pub. No.: WO2006/079734
PCT Pub. Date: Aug. 3, 2006

(65) Prior Publication Data
US 2010/0043912 A1    Feb. 25, 2010

(30) Foreign Application Priority Data
Jan. 26, 2005  (FR) ..................... 05 50222

(51) Int. Cl.
*B65B 1/30* (2006.01)
(52) U.S. Cl.
USPC ........... 141/192; 141/351; 141/382; 137/487; 137/487.5; 137/68.14; 137/68.11

(58) Field of Classification Search
USPC .......... 141/382, 192, 193, 349, 351; 137/487, 137/487.5, 67, 68.11, 68.14, 71, 73, 75
See application file for complete search history.

(56) References Cited

U.S. PATENT DOCUMENTS

| | | | | |
|---|---|---|---|---|
| 2,399,843 | A | * | 5/1946 | Adams ................... 251/129.02 |
| 3,388,746 | A | * | 6/1968 | Lindberg ....................... 169/56 |
| 4,099,551 | A | | 7/1978 | Billington et al. |
| 5,921,266 | A | | 7/1999 | Meyer et al. |

(Continued)

FOREIGN PATENT DOCUMENTS

| | | |
|---|---|---|
| DE | 94 06 232 | 7/1994 |
| GB | 2252163 | * 12/1990 |

(Continued)

OTHER PUBLICATIONS

International Search Report for PCT/FR2006/050004.
PCT Written Opinion for PCT/FR2006/050004.

*Primary Examiner* — Gregory Huson
*Assistant Examiner* — Jason K Niesz
(74) *Attorney, Agent, or Firm* — Christopher J. Cronin

(57) ABSTRACT

The high-pressure output (2) of a donor container is coupled to a user system (11) by means of a main transfer tube (4) through a pilot valve (5) controllable by an auxiliary line (6) which is connected (12) to an auxiliary circuit of the system (11), extends along the main tube (15) and is fixed thereto by the reduced length thereof at several distinct points ($S_i$). In such a way, the rupture or inflammable leakage of the tube (4) generates the tearing off or meting of the auxiliary line (6) in such a way that the output valve (5) is immediately closed. Said invention is particularly suitable for an inflammable gas supply to stationary plants.

10 Claims, 1 Drawing Sheet

U.S. PATENT DOCUMENTS

| | | | | |
|---|---|---|---|---|
| 5,927,316 A | * | 7/1999 | Merrill | 137/68.14 |
| 6,082,399 A | * | 7/2000 | Nyberg | 137/614.03 |
| 6,216,719 B1 | * | 4/2001 | Meyer | 137/68.14 |
| 6,308,753 B1 | | 10/2001 | Nimberger et al. | |
| 6,401,767 B1 | * | 6/2002 | Cohen et al. | 141/1 |

FOREIGN PATENT DOCUMENTS

| | | |
|---|---|---|
| JP | 52-126416 | 9/1977 |
| JP | 52-142221 | 10/1977 |
| WO | WO 02 070934 | 9/2002 |

* cited by examiner

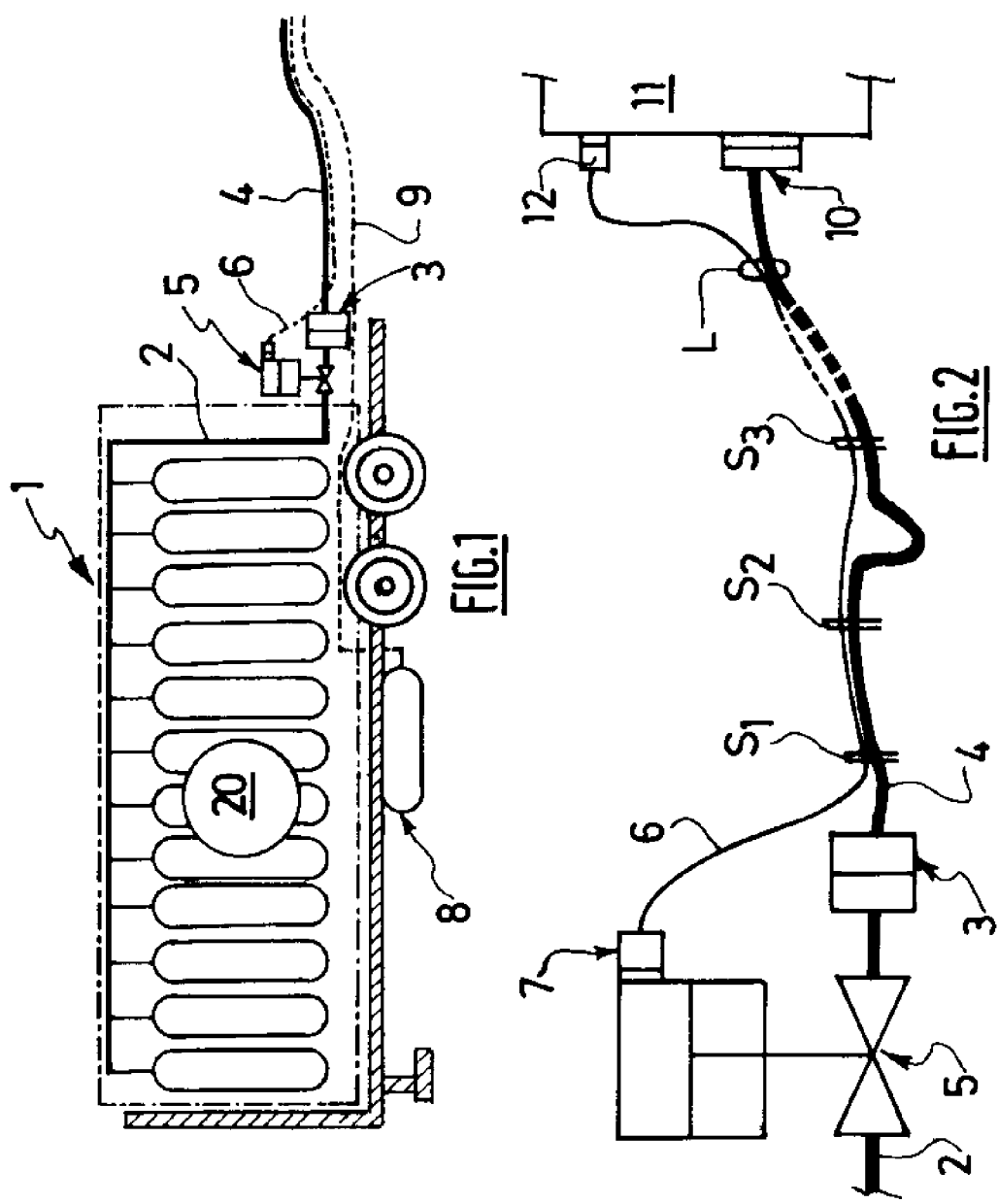

KIT AND DEVICE FOR CONNECTING AND TRANSFERRING FLUID AND THE USE OF SAID DEVICE

This application is a 371 of International PCT Application PCT/FR2006/050004, filed Jan. 6, 2006.

BACKGROUND

The present invention relates to devices for connecting and transferring fluid under pressure between a donor reservoir and a receiver installation, typically for using a tanker truck to refill a store of fluid belonging to a stationary installation.

The donor reservoir and the installation are connected via a transfer tube generally known as "hose", weighted for the maximum between the maximum operating pressure (PMS) of the donor reservoir and the maximum operating pressure of the source reservoir, which may be as much as 500 bar and over. This hose is handled upon each connection/disconnection operation and undergoes significant pressurization/depressurization cycles, and may even be crushed if an operator steps on it or if a vehicle, particularly the tanker truck itself, runs over it during its approach maneuver, and may be pulled out if the operator forgets to disconnect it when stowing the system away. This equipment is therefore particularly highly exposed and, although extreme care is taken in manufacturing it, the rupturing of this hose is a probability that has to be taken into consideration. This is because the rupturing of a hose containing a fluid under pressure, can prove highly dangerous if the fluid transferred is toxic and/or flammable, this being in addition to the mechanical "whiplash" which may seriously injure an operator and/or damage parts of the installation.

It is an object of the present invention to propose a device for connecting and transferring fluid under pressure safely that makes it possible both to reduce the "whiplash" effect and limit the risk of release, particularly ignition, of the gas being transferred should the main tube rupture.

In order to do this, according to one feature of the invention, the device for connecting and transferring fluid under pressure between a donor reservoir and a receiver installation, comprising a fluid transfer tube having a first end that can be connected to a fluid outlet coupling of the reservoir and a second end that can be connected to a fluid inlet of the installation, the reservoir comprising, upstream of the fluid outlet, a controlled shut-off valve that has a quick coupling for connecting to a first end of an auxiliary line that has a second end that can be connected to an auxiliary circuit of the installation, the auxiliary line being coupled, along a part of its length, to the transfer tube so that it runs along a substantial part of the latter and, over this coupling distance, is shorter in length than the transfer tube.

According to other features of the invention:
the auxiliary line is secured to the main transfer tube at at least two separate points
the controlled shut-off valve is a pneumatic valve and the auxiliary line is a low-pressure secondary tube containing fluid, typically nitrogen or dry air, for controlling instruments of the user installation
the controlled shut-off valve is an electrically operated valve and the auxiliary line is an electric line
the donor reservoir is mounted on a vehicle, typically a truck trailer
an auxiliary supply of compressed fluid or electricity is associated with the donor reservoir and can be connected to the auxiliary circuit of the receiver installation.

The present invention also relates to the use of such a device for supplying flammable gas, particularly hydrogen, to a fixed receiver installation.

The present invention also relates to a connecting kit for a connecting and transfer device of the type defined above, comprising a high-pressure main tube that has end couplings and a secondary tube made of plastic that has end couplings and is connected to the main tube at at least two mutually spaced and distinct zones.

Other features and advantages of the invention will become apparent from the following description of some embodiments which are given by way of nonlimiting illustration with reference to the attached drawings in which:

FIG. 1 is a schematic view of a tanker truck provided with a device for connecting and transferring fluid according to one embodiment of the invention; and FIG. 2 is a schematic view on a larger scale of the embodiment of FIG. 1 showing the connections of the main and secondary line to the donor reservoir and to the receiving installation.

The embodiment of FIG. 1 depicts a high-pressure road-going tanker comprising several reservoirs 20 for storing gas at high pressure (in excess of 160 bar, typically in excess of 200 bar, and advantageously in excess of 500 bar). These reservoirs deliver into an outlet pipe 2 ending in a high-pressure coupling element 3 for connecting to a removable transfer tube 4 and incorporating, upstream of this coupling element a shut-off or isolating valve 5 with a pneumatic actuator.

In the embodiment depicted, the valve 5 is a pneumatic valve operated by a low-pressure fluid carried by an auxiliary tube 6 connected to the valve 5 by a pull-out quick coupling 7.

In practice, the fluid carried by the secondary tube 6 is a gas at low pressure (typically nitrogen or dry air at a pressure of 6 to 10 bar) used in a dedicated system of the user installation for controlling and operating the various measurement instruments or actuators of this installation The instrument fluid is available from the user installation itself and/or from a reservoir 8 carried on board the truck trailer 1 and available via a low-pressure hose 9 that can be connected to the user installation. The reservoir 8 is advantageously repressurized, when necessary, using an air compressor unit belonging to the trailer tractor unit.

In the embodiment depicted in FIG. 2, the main tube 4, made of reinforced PTFE or corrugated stainless steel sheeting is connected, preferably screwed, downstream, to an inlet coupling 10 of the user installation 11 and the secondary tube 6 is also connected by a pullout quick coupling 12 to the instrument fluid system of the user installation 11.

According to one aspect of the invention, in this embodiment, the secondary tube 6 is made of a material with a low melting point below 200° C., particularly of a meltable thermoplastic, for example PVC, and is secured to the main tube 4 at at least two points S1, S2, S3 in such a way that it runs along most of this main tube but, as depicted between S2 and S3, has a shorter developed length than the transfer tube 4, the connection between the two tubes at the downstream part of the tube 4 being by means of a slack or sliding leash L.

In this embodiment, the valve 5 is of the type normally closed when there is no pressure in the auxiliary tube 6. It will therefore be understood that should the main tube 4 rupture in its upstream part, the first whiplash movement thereof will pull firmly on the secondary tube 6, opening the quick coupling 7 and therefore almost instantly closing the valve 5, thus preventing any leaks. Furthermore, in the event of a fire resulting from a leak from the main tube 4, the secondary tube 5 will soon melt and likewise case the valve 5 to be closed very quickly and thus also cause the fire to be extinguished quickly.

Should the operator forget to disconnect the tube 4 after the fluid transfer operation, the secondary tube 6 is quickly pulled out, causing the valve 5 to close and therefore limiting any leak of gas from the self-propelled tanker 1. What happens is that the tube 6 is shorter than the tube 4 in the portion between S1 and S3 (the part running along the tube 4), if the operator forgets to disconnect the tube 4, the valve 5, disconnected from the line 6, closes before the tube 4 ruptures, eliminating any external leak of gas from the reservoirs 20.

Although the invention has been described in conjunction with some particular embodiments, it is not restricted thereto but can be modified and varied in ways that will be obvious to one skilled in the art within the context of the claims which follow. In particular, instead of being a pneumatically actuated valve, the shut-off valve may be an electrically operated valve, the auxiliary control line 6 in this case being an electric cable terminated at both ends by quick-opening connectors 7 and 12, the auxiliary circuit of the receiver installation 11 therefore being an electric circuit thereof, the emergency battery 8 of the trailer 1 being an accumulator battery. Likewise, in such a scenario, the valve 5 may be closed by a safety device, for example an analyzer/leak detector mounted to the rear of the trailer 1. In both instances, the valve 5 can also be closed as an emergency measure using an emergency stop button, which may be pneumatic or magnetic. The invention is particularly suited to fleets of tankers supplying gaseous hydrogen at pressures in excess of 160 bar to fixed installations, particularly electricity generating installations, particularly those of the fuel cell type.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A system for transferring fluid under pressure, comprising:
    a donor reservoir adapted and configured to contain the fluid under pressure, the donor reservoir having a fluid outlet coupling and a controlled outlet shut-off valve with a quick coupling;
    a receiver installation adapted and configured to contain the fluid under pressure, the receiver installation having an inlet coupling and a pullout quick coupling;
    a fluid transfer tube having first and second ends, the first end connecting to the donor reservoir fluid outlet coupling, the second end connecting to the receiver installation inlet coupling;
    an auxiliary line having first and second ends, the first end connecting to the quick coupling of the shut-off valve, the second end connecting to the receiver installation pullout quick coupling;
    wherein a portion of the auxiliary line is coupled to the fluid transfer tube along a coupling distance, and
    wherein a length of the auxiliary line that extends over the coupling distance is shorter than a length of the fluid transfer tube that extends over the coupling distance.

2. The system of claim 1, wherein the coupling of the auxiliary line and fluid transfer tube comprises the securing of the fluid transfer tube to the auxiliary line at at least two separate points.

3. The system of claim 1, wherein the controlled shut-off valve is an electrically operated valve and the auxiliary line is an electrical line.

4. The system of claim 1, wherein the controlled shut-off valve is a pneumatic valve and the auxiliary line is adapted and configured to contain a low-pressure fluid for controlling instruments associated with the receiving installation.

5. The system of claim 4, wherein the auxiliary line is made of a material with a low melting point.

6. The system of claim 1, further comprising an auxiliary supply of electricity or fluid associated with the donor reservoir, the auxiliary supply fluidically or electrically communicating with the receiver installation pullout quick coupling.

7. The device of claim 1, wherein the donor reservoir is mounted on a vehicle.

8. A method of transferring fluid under pressure, comprising the steps of:
    providing the device of claim 1, wherein the donor reservoir contains the pressurized fluid and the pressurized fluid is a flammable gas; and
    allowing the fluid to flow from the donor reservoir to the receiver installation through the fluid transfer tube.

9. The method of claim 8, wherein the flammable gas is hydrogen.

10. The system of claim 1, wherein the portion of the auxiliary line coupled to the fluid transfer tube along a coupling distance is coupled along part of its length by way of a slack or sliding leash so that it runs over a substantial part of the fluid transfer tube.

* * * * *